Figure 1:
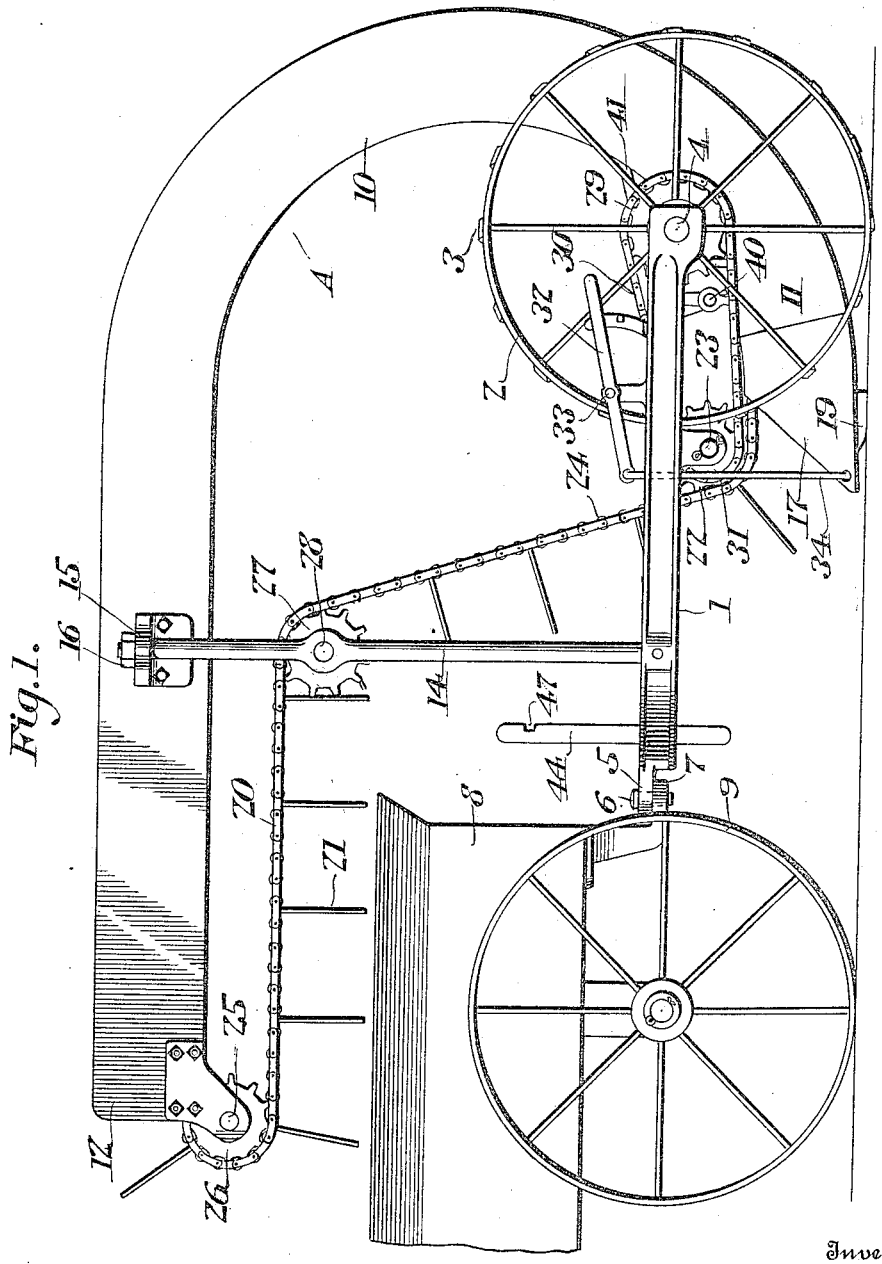

E. C. WEANER.
SNOW SHOVEL AND LOADER.
APPLICATION FILED AUG. 31, 1915.

1,214,397.

Patented Jan. 30, 1917.
3 SHEETS—SHEET 1.

Witnesses

Inventor
Edgar C. Weaner
By Victor J. Evans
Attorney

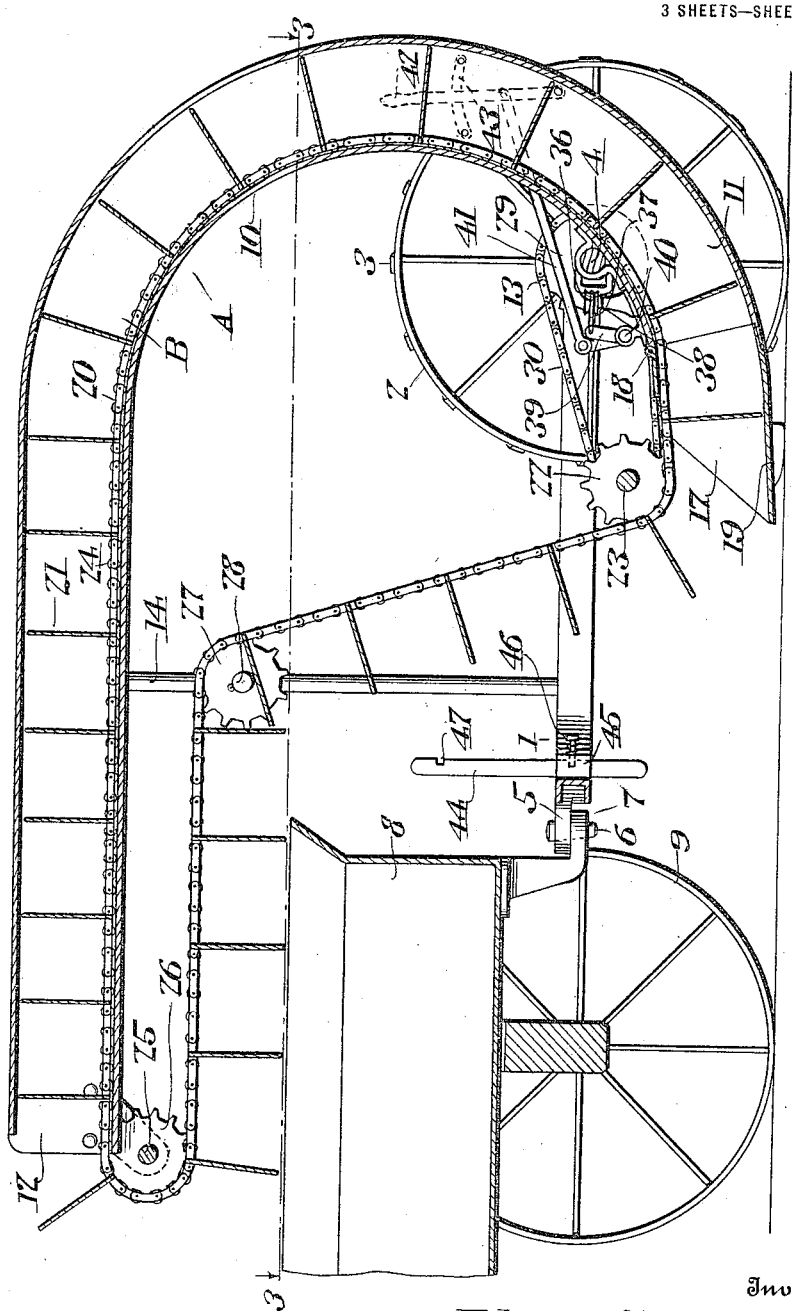

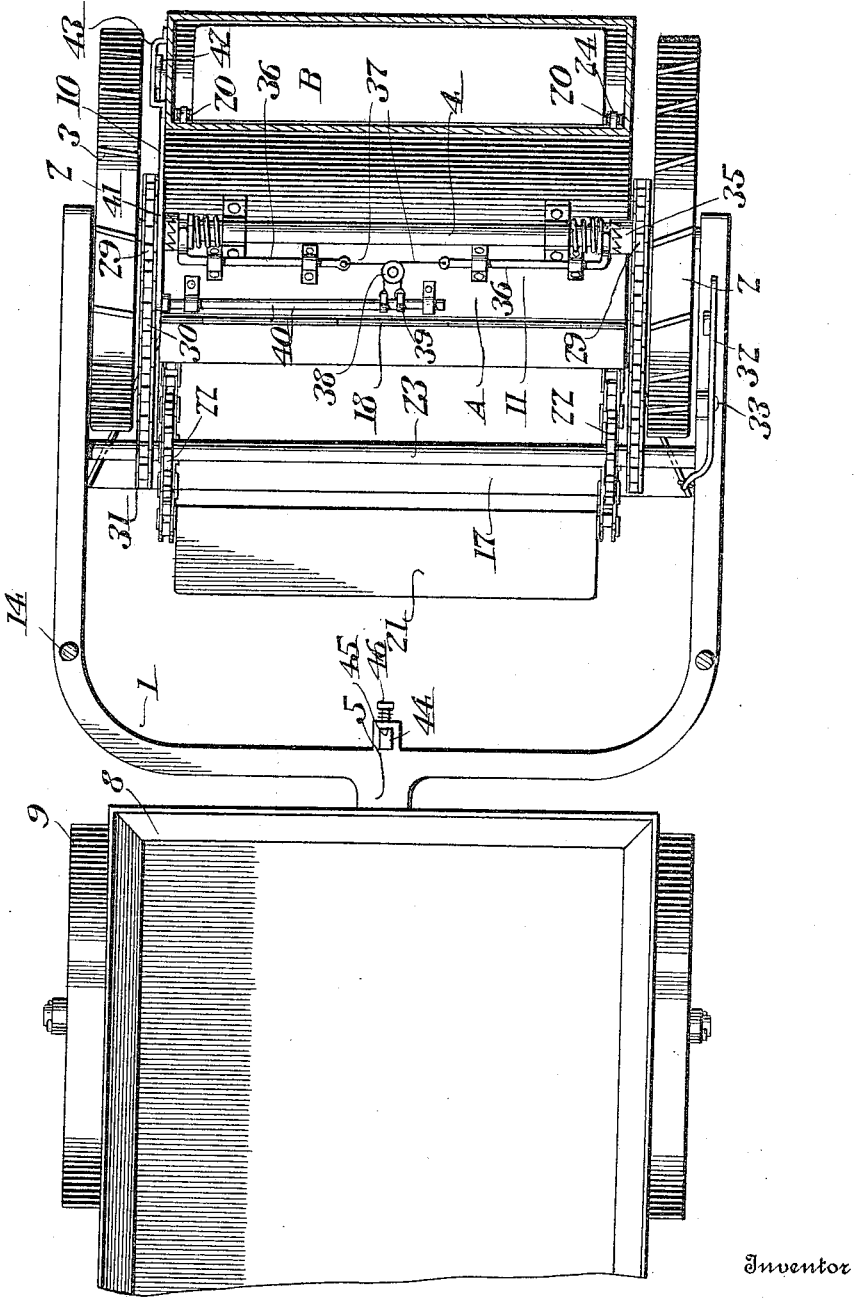

UNITED STATES PATENT OFFICE.

EDGAR C. WEANER, OF TOLEDO, OHIO, ASSIGNOR OF ONE-HALF TO CHARLES D. LEACH, OF TOLEDO, OHIO.

SNOW SHOVEL AND LOADER.

1,214,397.      Specification of Letters Patent.      Patented Jan. 30, 1917.

Application filed August 31, 1915. Serial No. 48,266.

*To all whom it may concern:*

Be it known that I, EDGAR C. WEANER, a citizen of the United States, residing at Toledo, in the county of Lucas and State of Ohio, have invented new and useful Improvements in Snow Shovels and Loaders, of which the following is a specification.

This invention relates to snow shovels and loaders, the object in view being to produce what may be termed a trailer truck embodying a wheeled frame, a scoop carried thereby, and conveyer mechanism actuated by one or both of the truck wheels and adapted to convey the snow from the scoop to an elevated point and discharge the snow in advance of and above the trailer truck into a receptacle which may consist of a wagon behind which the trailer truck is coupled.

A further object of the invention is to provide in connection with the trailer truck, a scoop which as a whole is pivotally related to the conveyer so that it may rock on a horizontal axis when the scoop meets an obstruction, thereby preventing injury to the scoop and conveyer.

With the above and other objects in view, the invention consists in the novel construction, combination and arrangement of parts, as herein described, illustrated and claimed.

In the accompanying drawings: Figure 1 is a side elevation of a snow shovel and loader embodying the present invention. Fig. 2 is a vertical longitudinal section through the same. Fig. 3 is a horizontal section on the line 3—3 of Fig. 1 looking downwardly.

The trailer truck of this invention embodies a truck frame 1 which is shown substantially U-shaped and supported at the rear end thereof by means of carrying wheels 2 which are preferably provided on their tread surface with traction ribs or cleats 3, the wheels 2 being mounted upon an axle 4 journaled in the side arms of the truck frame 1 as shown. At its forward end the truck frame 1 is provided with an extension 5 adapting the truck frame to be coupled to the towing vehicle by means of a detachable coupling pin 6 which engages a corresponding extension or rearwardly extending lug or tongue 7 on the towing vehicle, the latter being shown for convenience as in the form of a wagon comprising the snow receiving body 8 and carrying wheels 9.

Mounted on the trailer truck is a conveyer indicated generally at A the same comprising a C-shaped chute 10 preferably tubular and rectangular in cross section and having the receiving end 11 and the discharging end 12 thereof facing in the same direction or toward the direction in which the machine is traveling. The chute 10 is shown as supported on the axle 4 by means of straps 13 and is further supported by means of uprights or standards 14 fastened at their lower extremities to the truck frame and fastened adjacent to their upper ends to the conveyer chute 10 by inserting the upper ends of the standards 14 through lugs 15 on the upper overhanging portion of the chute, the upper ends of the standards 14 being threaded and secured by means of nuts 16.

Connected to the receiving end of the chute 10 is a scoop 17 which is hinged along its upper rear edge at 18 to the chute 10 thereby permitting the forward edge of the scoop to rise and fall so that it may ride over obstacles, the scoop 17 being provided on its under side with runners 19 for that purpose, the runners 19 traveling in contact with the road surface.

An endless chain of buckets designated generally at B is shown as comprising parallel chains 20 having attached thereto at intervals snow shovels 21, the chains 20 passing around sprocket wheels 22 on a shaft 23 arranged in front of the axle 4 and thence upwardly through the chute 10, said chains being provided with anti-friction rollers 24 which roll in contact with the floor of the chute. At the discharge end of the chute 10 is a shaft 25 on which are sprocket wheels 26 around which the chains 20 pass and between the sprocket wheels 22 and 26 are other sprocket wheels 27 over which the chains 20 pass, the sprocket wheels 27 being journaled on stud shafts 28 carried by the standards 14 above referred to.

In operation, the snow shovel and loader is coupled to the rear end of a snow receptacle such as a wagon as indicated in the drawings and being drawn thereby, the scoop 17 acts as a scraper and the shovels 22 which are driven at a greater relative speed than the forward movement of the vehicle engage the snow as it enters the scoop and carry the same upwardly through the chute 10 and discharge the same into the body 8 of the towing vehicle. As soon as the receptacle 8 is filled, it is uncoupled from the trailer truck and driven to the dumping place and another wagon or the like is coupled to the trailer truck and the operation continued.

The means for driving the chain of buckets comprises a pair of sprocket wheels 29 fast on the axle 4 from which sprocket chains 30 extend forwardly around sprocket wheels 31 on the shaft 23 above referred to. The wheels 31 are smaller in diameter than the wheels 29 so as to cause the buckets 21 to travel at greater speed than the forward movement of the vehicle thereby preventing the snow from choking the chute 10.

Having thus described my invention, I claim:—

A snow shovel and loader, embodying in combination, a wheeled trailer truck, a snow scoop carried by said truck, loading means embodying a conveyer which takes the snow from the scoop and discharges the same at a point in advance of the trailer truck, said conveyer comprising a chute having its receiving and discharging ends facing in the same direction and embodying a semicircular rear portion closed in on all four sides and also having a horizontally extended discharge portion forming a continuation of said semicircular portion, an endless chain of snow propelling blades, the outer free edges of which sweep in close proximity to the outer wall of said semicircular portion of the chute, and means actuated by a truck wheel for driving said chain of propelling blades.

In testimony whereof I affix my signature in presence of two witnesses.

EDGAR C. WEANER.

Witnesses:
 CHARLES D. LEACH,
 H. D. BARTON.

Copies of this patent may be obtained for five cents each, by addressing the "Commissioner of Patents, Washington, D. C."